July 24, 1973 K. G. AUBUCHON ET AL 3,748,187

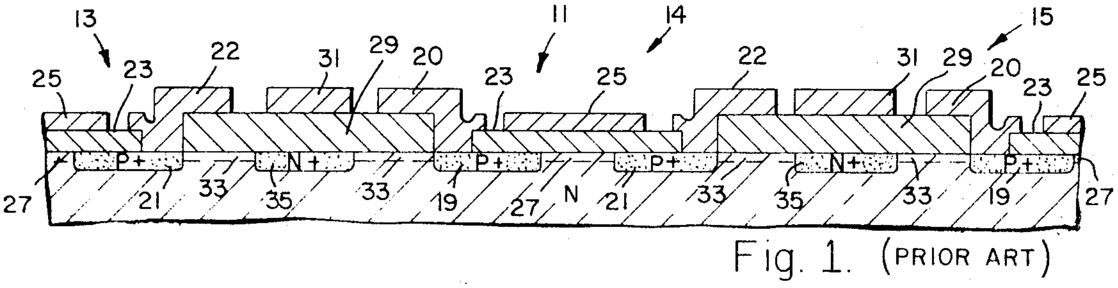
Fig. 1. (PRIOR ART)
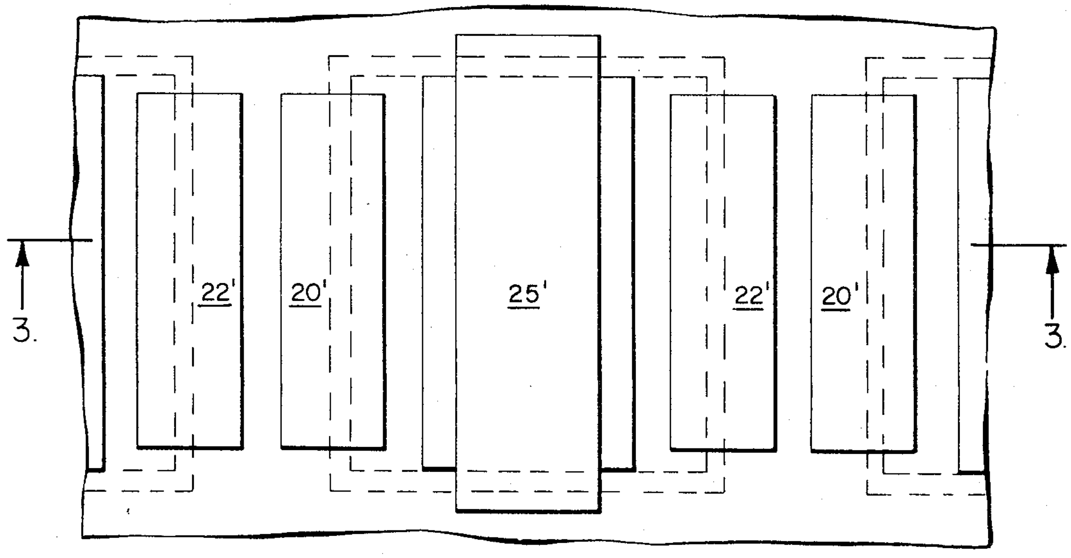
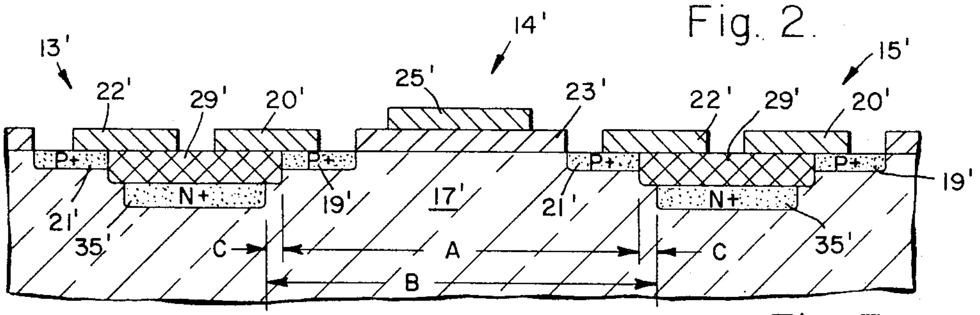
Fig. 2.
Fig. 3.
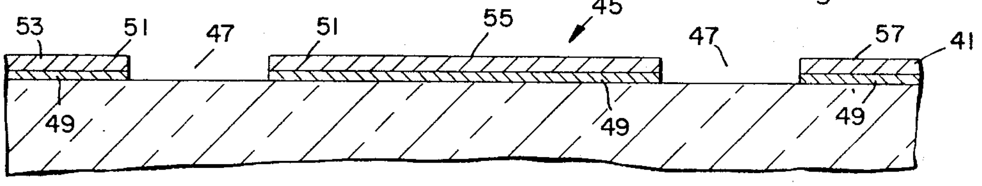
Fig. 4a.
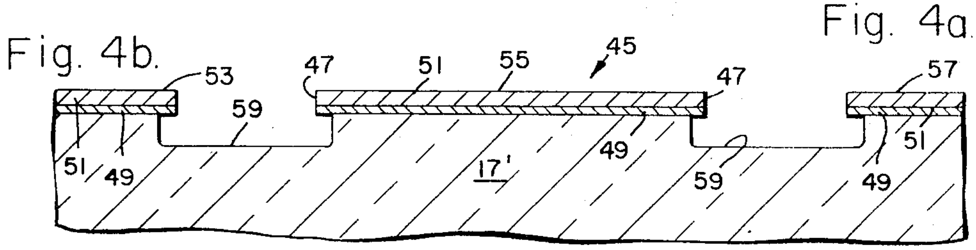
Fig. 4b.

SELF-REGISTERED DOPED LAYER FOR PREVENTING FIELD INVERSION IN MIS CIRCUITS

Filed Aug. 3, 1971 3 Sheets-Sheet 2

United States Patent Office 3,748,187

Patented July 24, 1973

3,748,187

SELF-REGISTERED DOPED LAYER FOR PREVENTING FIELD INVERSION IN MIS CIRCUITS

Kenneth G. Aubuchon and Hans G. Dill, Costa Mesa, and Robert W. Bower, Palos Verdes, Calif., assignors to Hughes Aircraft Company, Culver City, Calif.

Filed Aug. 3, 1971, Ser. No. 168,713
Int. Cl. H01l 7/54
U.S. Cl. 148—1.5 10 Claims

ABSTRACT OF THE DISCLOSURE

Field inversion or "channeling" between adjacent MIS devices in a common substrate is inhibited by forming a recessed insulating region between the devices and by forming a heavily doped channel-stopping layer under the insulating layer. The insulating layer extends into the substrate to a greater depth than do the diffusions of the adjacent MIS devices and it extends laterally beyond the edges of the channel-stopping layer under it. As a result the channel-stopping layer is safely spaced from both of the adjacent diffusions.

The present invention relates to semiconductor devices of the type wherein relatively heavily doped regions of a given conductivity type which are to be electrically isolated from one another are closely spaced at the surface of a lightly doped substrate of the opposite conductivity type, with an insulating layer covering the surface of the substrate between them, on top of which an electrical potential is exerted either by a conductor or by electric charges distributed on the surface of the insulator. Under these conditions, the electric potential on top of the insulating layer may have the effect of inverting the substrate surface to the same conductivity type as that of the heavily doped spaced apart regions, thus allowing undesirable currents to flow between the heavily doped regions. The present invention is directed to diminishing this effect.

The above effect is particularly serious in MISFET integrated circuits, which comprise a plurality of metal-insulator-semiconductor (MIS) devices formed in a common semiconducting wafer or substrate. Typically, such integrated circuits include many pairs of relatively highly doped regions at the surface of a relatively lightly doped semiconducting substrate, these regions having a conductivity type which is the opposite of that of the substrate. A thin (approximately 1200 A.) insulating layer called the "gate insulator" is formed on the surface of the substrate between each pair of doped regions and a conducting gate electrode is deposited upon the insulating layer. Metal electrodes are connected to the doped regions, one of which is called the "source" and the other the "drain." Current flows from the source to the drain through a conductive layer, called a "channel," which is induced at the surface of the semiconductor by a potential applied to the gate electrode, with the magnitude of the current for a given source-to-drain voltage being modulated by the gate potential. The area of the common substrate between adjacent MIS devices is covered by a relatively thick (typically 1 to 2 microns) insulating layer, called the "field insulator." The formation of an inversion layer under the field insulator is called "field inversion." While not necessarily so, it will be assumed for purposes of this discussion, that the substrate is N-type silicon, the relatively heavily doped region are of P-type conductivity, and the gate and field insulators are silicon dioxide, and are referred to as the "gate oxide" and "field oxide," respectively. Such a device is commonly referred to as a metal-oxide-semiconductor (MOS) and will be so referred to herein.

The presence of an inversion layer between adjacent MOS devices gives rise to undesirable leakage currents between them. Field inversion in MOS integrated circuits may be caused by conductors which are deposited on the field oxide between adjacent MOS devices and which serve to apply operating voltages to various ones of the devices. Alternatively, field inversion may also come about due to the accumulation of electric charge on the field oxide.

At least three methods are known to have been employed to raise the voltage at which field inversion will occur. The first is to make the field oxide considerably thicker than the gate oxide. The second method is to diffuse a dopant under the field oxide in well-defined areas which do not touch the source and drain regions so as to create between adjacent MOS devices a barrier to the flow of current between them. The third method is to diffuse a dopant everywhere under the field oxide. The first of the above methods, called the "thick oxide" process, is the one most commonly used. Its shortcoming is that the relatively great thickness of the field oxide, as compared to the gate oxide, increases the probability of metal conductors breaking at the point where they pass over a large step in the oxide, this step occurring at the point where the field oxide and the gate oxide meet. The second method is often referred to as the "channel stopper" method because the field inversion in effect creates a channel between adjacent MOS devices in the substrate and the formation of a doped strip between adjacent such devices has the effect of breaking the continuity of the channel formed between them. The disadvantage of the latter method is that its use increases the space which must be left between adjacent devices, due to the fact that the channel stopper region must not contact the source or drain regions of the MOS devices between which the channel stopper region lies, so that the channel stopper region cannot extend out all the way to the edge of the field oxide. This, then, has the further disadvantage that the edge portions of the field oxide do not have a channel stopper region under them, and hence are susceptible to localized inversions. The third method is carried out by depositing a doped oxide over the substrate, then selectively removing it over the channel regions where the gate oxide is then grown. The dopant is diffused from the doped oxide into the field areas during the gate oxidation. The disadvantage of this method is that, since the entire field is doped, it touches the adjacent source and drain regions, thus lowering their breakdown voltage.

One solution to the invention problem is described in patent application Ser. No. 116,785 filed by Kenneth G. Aubuchon for "Electrically Charged Insulator on a Semiconductor Substrate," and assigned to the assignee of the present invention. As described in the referenced patent application, an electric charge is selectively introduced into those portions of the insulating layer on the surface of a semiconducting substrate under which inversion is to be prevented, the sign of the electric charge being the opposite of the sign of the majority carriers in the substrate. Thus in the case of an MOS integrated circuit, the electric charge so introduced is confined to the field insulator. A charge is not introduced into the gate insulator since this would increase the gate threshold voltage.

The principal object of the present invention is to reduce the size of MIS integrated circuits having channel-stopping regions between adjacent MIS devices.

More specifically, it is an object of the present invention to provide an alternative solution to the problem of field inversion which does not rely on the introduction of an electric charge into the insulating layer on the surface of the semiconducting substrate as taught by Aubuchon, yet which achieves the same advantages of freedom from the inherent problems of the first three recited methods, i.e. the thick oxide process, the channel-stopper method and the doped oxide method. More specifically, it is an object of the present invention to provide a self-registering channel-stopping region between adjacent MIS devices on a common substrate so as to attain the field inversion-preventing function of the channel stopper without its inherent disadvantage of requiring space on both sides of the channel stopper in order to prevent short circuiting the diffusions between which it is located.

In accordance with the invention, the field oxide is recessed into the surface of the substrate with the channel-stopping region remaining under it, and hence being substantially below the substrate's surface. Preferably the field oxide extends to a greater depth into the substrate than do the diffusions next to it and extends laterally beyond the channel-stopping region by a precisely determinable amount, thereby providing secure separation of the channel-stopping region from the adjacent diffusions without requiring excessive space to do so.

An important feature of the present invention is a method for accurately locating both the channel-stopping region and the field oxide which extends above it, recessed in the substrate surface.

It should be understood that, while the following discussion is, for sake of concreteness, in terms of "field oxide," the invention is also applicable where the insulator in question is not an oxide, and where it is not in the space between a pair of adjacent MIS devices.

The initial step of the inventive process is to form a mask on the substrate, the mask having gaps to expose portions of the substrate surface. Depressions are then excavated in the exposed substrate surface in such a manner that the edges of the depressions undercut the mask. Channel-stopping regions are formed next by increasing the doping of the substrate at the bottom of the depressions over an area which corresponds to the gaps in the mask. The excavated depressions are then filled with an insulator (the field oxide) and, finally, source-drain diffusions are formed in the surface of the substrate for the adjacent MIS devices, a pair of diffusions being located on opposite sides of and immediately adjacent to the edges of the field oxide which was used to fill the depressions in the substrate.

Since the lateral area of the field oxide is determined by the lateral dimension of the excavated depressions, while the lateral area of the channel stopper regions is determined by the gaps in the mask, and since the gaps in the mask are smaller than the lateral dimension of the depressions, it follows that the field oxide extends past the channel stopper regions below it, thereby insuring that the channel stoppers will be spaced from the pair of diffusions which are on opposite sides of the insulator. The amount by which the channel stoppers are so spaced need not be large and can be precisely predetermined by controlling the extent to which the depressions formed in the surface of the substrate extend past the corresponding gasp in the mask.

In further keeping with the process aspect of the invention, it is preferable that the field oxide which covers the channel stopper regions extend into the substrate to a greater depth than do the diffusions on the opposite sides thereof, so as to increase the separation of the diffusions from the doped layer between them, without increasing the distance by which they are spaced from each other. This can be simply achieved by excavating the depressions to a greater depth than the depth of the diffusions.

It is another and more specific feature of the present invention, that the lateral extent of the channel stopper is made to correspond substantially to the area of the mask opening by using ion implantation through the mask as the method by which the doping of the substrate is increased. A related feature of the invention is that the depression in the surface of the substrate is formed through the opening in the mask by subjecting the exposed surface to an etchant or alternatively to oxidation, both of which have the effect of undercutting the mask slightly beyond the edges of the gaps therein so as to eventually provide the lateral spacing between the more heavily doped portion of the substrate at the bottom of the depression and the source-drain diffusions on opposite sides of the field oxide above the more heavily doped region.

The invention will be described in greater detail by reference to the drawings in which:

FIG. 1 is a cross section through a known type of MIS integrated circuit wherein adjacent MIS devices are separated by a field region having a channel stopper to inhibit field inversion;

FIG. 2 is a plan view of an integrated circuit made in accordance with the present invention;

FIG. 3 is a cross section through the circuit of FIG. 2 illustrating the configuration of the subsurface channel stopper and the recessed field oxide above it, both being located between adjacent diffusions of different MOS devices in the same substrate;

Figure 4C:
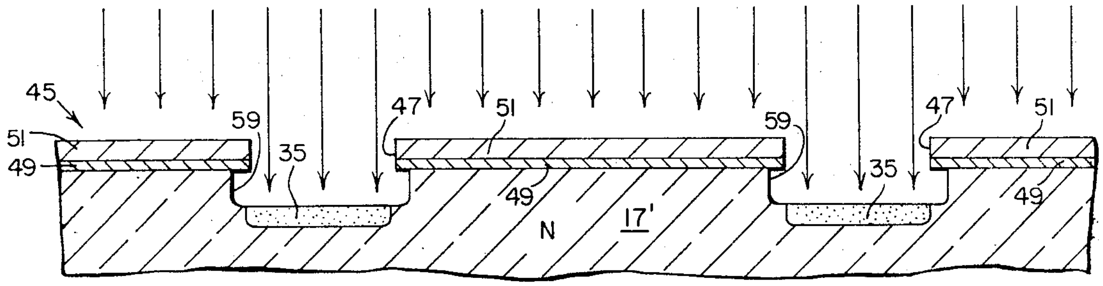

FIGS. *4a–4k* are views of an MOS integrated circuit in various stages of fabrication, the last one resulting in the device illustrated in FIG. 3.

Before proceeding with a detailed description of a method whereby the invention may be implemented, it will be helpful first to consider with reference to FIG. 1 the phenomenon of field inversion, whose prevention is the principal object of the present invention.

FIG. 1 illustrates in cross section a portion of an MOS integrated circuit 11, the portion including three adjacent MOS devices 13, 14 and 15 (only portions of 13 and 15 being shown), formed in a relatively lightly doped substrate 17, usually a silicon wafer about two inches in diameter, shown as having N-type conductivity. The MOS device 14 includes spaced apart, relatively heavily doped, source and drain regions 19 and 21 of P-type conductivity near the surface of the substrate 17. Source and drain contacts 20 and 22 form ohmic connections with the source and drain regions 19 and 21 respectively. A relatively thin gate oxide layer 23 extends along the surface of the substrate 17 between the source and drain regions 19 and 21, and a gate member 25 extends on top of the gate oxide.

Elements corresponding to those making up the MOS device 11 also comprise the other MOS devices 13 and 15 and are correspondingly numbered. In each device, a conductive path (or channel) 27 is created in the substrate 17 near its surface between the source and drain regions 19 and 21 by the application of a negative potential to the gate member 25 which induces a layer of positive charges in the substrate. These positive charges serve to carry current from the source 19 to the drain 21 when the latter is biased negatively relative to the former.

Running between the adjacent MOS devices 13, 14 and 15 is an insulator strip 29, which, for a silicon substrate, is typically thermally grown silicon dioxide. Referred to as the "field oxide," the layer 29 usually supports metal conductors which serve to carry operating potentials to the various source and drain regions of the integrated circuit. The conductor may run along the length of the field oxide strip 29, as is the case with the conductors 20 and 22, which run along opposite edges of the field oxide strip. Alternatively, such a conductor may extend substantially across the field oxide strip 29, as exemplified by the conductor 31 which is not connected to any of the devices 13, 14 and 15, but serves other devices of the integrated circuit.

It will be recalled that the application of a negative potential to the gate member 25 induces a conductive layer 27 of positive charges in the substrate surface between the source and drain regions 19 and 21. In the same manner, the application of a negative potential to the conductor 31, or to the conductors 20 and 22, tends to induce a conductive layer of positive charges 33 under the field oxide 29.

The conductive layer 33 may be considered as a parasitic "channel" through which leakage currents will flow between the source and drain regions 19 and 21 of adjacent ones of the devices 13, 14 and 15.

To alleviate the voltage inversion problem, a relatively heavily doped N-type conductivity channel stopper region 35 is provided between the source and drain regions 19 and 21 of the devices 13, 14 and 15. The continuity of the parasitic channel 33 is interrupted by the channel stopper region 35 because the latter is so heavily doped, i.e., it has so many excess negative charge carriers, that even at the highest negative potential encountered on the conductors 20, 22 and 31, there are not sufficient positive charges induced in the channel stopper region 35 to result in a layer whose net charge is positive.

The channel stopper technique illustrated in FIG. 1 requires that there be spaces between the channel stopper region 35 and the source and drain regions 19 and 21 of the adjacent MOS devices 13, 14 and 15 in order to prevent the heavily doped regions of opposite conductivity from contacting one another, a condition which would decrease the junction breakdown voltage. Consequently, this technique is applied at a considerable sacrifice of space and does not completely eliminate the possibility of field inversion, since the channel-stopping region must stop substantially short of the edge of the field oxide.

An improved integrated circuit made in accordance with the present invention is illustrated in FIGS. 2 and 3, wherein the improved device is illustrated as being similar to the prior art device shown in FIG. 1 in order to best illustrate the differences between the two. Accordingly, as best seen in the cross section of FIG. 3, every element shown in FIG. 1 has a corresponding counterpart serving the same function in FIG. 3 and each such corresponding counterpart is identified by the same reference numeral as is used in FIG. 1, but with a prime (′) added. In order to simplify the discussion relating to FIGS. 2 and 3, the conductors 31 shown in FIG. 1 are omitted therefrom.

It will be noted from a comparison of FIGS. 1 and 3 that the improved device made according to the present invention has a field oxide layer 29′ between the devices 3′, 14′ and 15′, as was the case with FIG. 1, but that the field oxide layer 29′ of FIG. 3 is recessed into the surface of the substrate 17′ of that device. Channel stopper regions 35′ corresponding to the channel stopper regions 35 of FIG. 1 extend under the field oxide regions 29′. Significantly, however, there is virtually no lateral gap between the channel stopper regions 35′ illustrated in FIG. 3 and the doped source and drain regions 21′ and 19′ between which they are disposed. This is due partially to the fact that field oxide region 29′ extends into the substrate 17′ to a greater depth than do the source and drain regions 21′ and 19′. By so extending the field oxide regions into the substrate 17′, the channel stopper regions 35′ are caused to be vertically spaced (i.e., at right angles to the surface of the substrate 17′) from the source and drain regions 21′ and 19′, thereby permitting the channel stopper regions 35′ to extend laterally practically to the edges of the source and drain regions without the danger of short circuiting them.

An important feature of the present invention is the process by which the channel stopper regions 35′ are formed, a process which permits them to extend toward but not entirely to the edges of the field oxide regions 29′. More specifically, but without getting into the details of the inventive process, the relative lateral dimensions of the channel stopper regions 35′ and the field oxide regions 29′ above them are very precisely controlled by the present invention so as to maximize the lateral extent of the channel stopper regions 35′ while at the same time insuring that a certain amount of lateral spacing is maintained between their edges and the source and drain regions 21′ and 19′ which they serve to isolate.

A better understanding of the device depicted by the cross-sectional view of FIG. 3 can be gained from FIG. 2 which is a plan view of the device and through which the cross section of FIG. 3 is taken. As seen from FIG. 2, the field oxide regions 29′ between adjacent ones of the semiconducting devices 13′, 14′ and 15′ are actually a part of a continuous field oxide layer which extends typically over the entire surface of the substrate 17′ and in which windows or openings 41 having a width "A" are formed so as to expose those portions of the substrate 17′ where the active regions containing the devices 13′, 14′ and 15′ are to be formed. Further it is seen from FIG. 2 that the channel stopping regions 35′ are a part of a continuous N+ layer 35′ which extends under the field oxide layer 29′ and which is substantially coextensive therewith with the exception that the N+ layer 35′ includes gaps 43 therein which have a width "B" slightly larger than the width "A" of the field oxide openings 41. Within the gaps 41 the substrate 17′ has its initial N-type conductivity. In this manner the source and drain diffusions 19′ and 21′ which extend along opposite edges of the openings 41′ are laterally spaced from the N+ channel stopping layer 35′ by the spaces "C" between the edges of the N+ layer 35′ defining the opening 43 and the edges of the field oxide layer 29′ defining the gap 41. Typically the spaces "C" may be made to be as small as one ten thousandth of an inch by use of the present invention.

The first step in manufacturing the exemplary device in accordance with the present invention is to form a mask 45 on the surface of the substrate 17′, there being gaps 47 in the mask in order to expose portions of the substrate surface (FIG. 4*a*). Although other materials might be used, the substrate will be assumed to be silicon. The mask includes a bottom layer 49, preferably of silicon nitride ($Si_3N_4$), whose function is to prevent oxidation of the substrate under it. Additionally, in order to build up the mask 45 to a sufficient thickness to stop ions from reaching the substrate, the mask also includes an upper layer 51, preferably chromium.

The silicon nitride layer 49 and the chromium layer 51 are formed in succession, their respective thicknesses being approximately 1000 A. and 2000 A. Gaps 47 are then formed in the mask 45 over those portions of the substrate 17′ which are to be excavated.

Having thus formed the mask 45 with the gaps 47 therein, the next step is to excavate the exposed portions of the substrate 17′. At this point it should be noted that while it is proper to consider the mask 45 to be in the form of a layer along the surface of the substrate 17′, with gaps existing between portions of the layer, it is also proper to consider the mask 45 as being comprised of a plurality of spaced apart mask portions represented by the segments 53, 55 and 57 in FIG. 4*a*, with the gaps 47 being disposed between respective pairs of the mask portions 53, 55 and 57.

To perform the step of excavating the exposed surface of the substrate 17′, the surface is exposed to an etchant for a sufficient time to remove approximately 1 micron of the silicon substrate surface. Significantly, exposure of the substrate 17′ to the etchant will cause the etchant to undercut the mask 45 so as to produce an excavation in the silicon substrate 17′ which is slightly larger than the gap 47 in the mask 45. Conversely, there have been formed, on the substrate 17 under the respective mask portions 53, 55 and 57, mesas which are slightly smaller than those mask portions. As an alternative to the use of an etchant to produce the excavations 59 in the substrate 17′ the latter may be exposed to an oxidizing atmosphere at a sufficiently high temperature to cause the exposed portions of the substrate to be oxidized to the desired depth after which the oxide is stripped. Typically, this would be steam at approximately 1100° C. for several hours.

Having formed the excavations 59 in the substrate 17', the next step is the formation of the N+ channel stopping regions by increasing the doping of the substrate 17' at the bottom, or floor, portions of the excavations 59 over an area which is slightly less than that of the floor portions 59. This is advantageously achieved by the use of ion implantation in combination with the mask 45, since the implanted ions travel in a straight path into the substrate 17', so that the implanted regions underneath the excavations 59 stop short of the edges of those excavations which extend underneath the mask 45 due to the undercutting effect of the etchant (FIG. 4*c*).

Conductivity-type-determining techniques for causing ions to enter selected portions of a substrate, either directly or indirectly, for doping are well known and reference may be made for this purpose to Patent No. 3,514,844, issued to Bower and Shifrin and assigned to the assignee of the present invention. It will be noted that the implanted channel-stopping regions 35' are of the N+ conductivity type and that their lateral extent corresponds to that of the openings or gaps 47 in the mask 45.

Figure 4D:
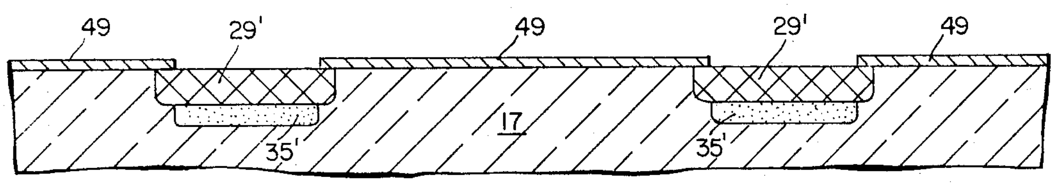
Figure 4E:
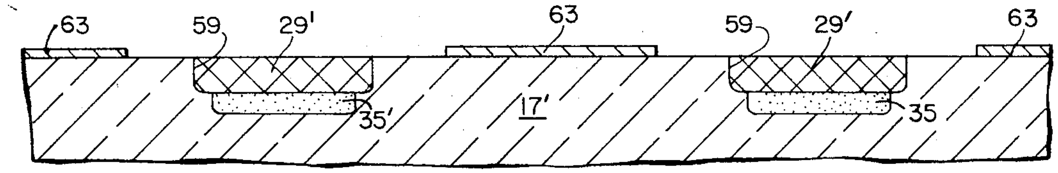

Following the step of ion implantation for increasing the doping of the regions 35', the chromium layer 51 is removed in preparation for the next step shown in FIG. 4*d* in which the excavations 59 are filled with an insulator. In the exemplary process illustrated in FIGS. 4*a*–4*k*, the insulator is of silicon oxide and is formed by oxidizing the exposed portions of the substrate 17' and the reason for removing the chromium layer 51 before this step is that it cannot withstand the elevated temperatures used to achieve oxidation. The substrate 17' is exposed to an oxidizing atmosphere such as steam at an elevated temperature, typically 1100° C. for a period sufficient to cause an oxide layer to build up inside the excavations 59 at least to the level of the surface of the substrate 17' upon which the mask 45 extends, typically several hours. This built-up oxide layer is the field oxide 29' to which reference was previously made with respect to FIGS. 2 and 3.

Figure 4F:
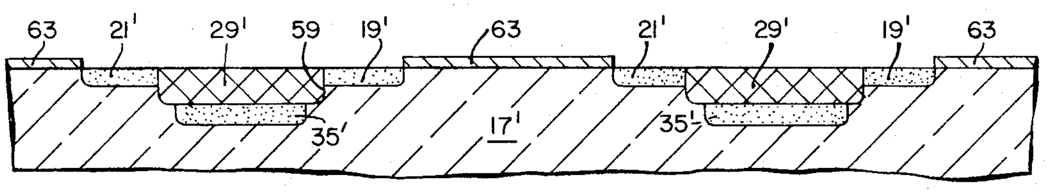
Figure 4G:
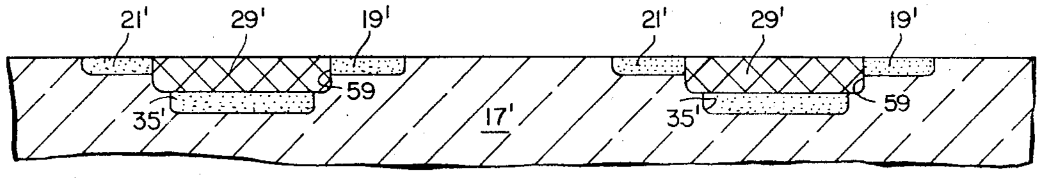

With the field oxide 29' in the excavations 59, portions of the silicon nitride layer 49 are removed by a standard photolithographic process to form a second mask 63 which exposes those portions of the substrate 17' in which the source and drain regions are to be formed. In the exemplary process the source and drain regions are illustrated as being formed by the conventional diffusion process in which the masked substrate 17' is exposed to boron at a temperature of 1000° C. for a period of about 20 minutes. The resulting source and drain regions 19' and 21' are seen in FIG. 4*f* as being defined by the field oxide regions 29' and by the mask 63, and are seen to occupy the ledges of the substrate mesas abutting the excavations 59.

It is important to note that the depth of the diffused source and drain regions 19' and 21' is less than that of the field oxide 29'. Consequently, even though laterally the N+ channel stopper regions 35' extend almost to the diffused source and drain regions 19' and 21', neither of those regions comes into contact with the channel stopper regions 35' because of the vertical separation achieved by the relatively greater depth of the field oxide regions 29'.

Figure 4H:
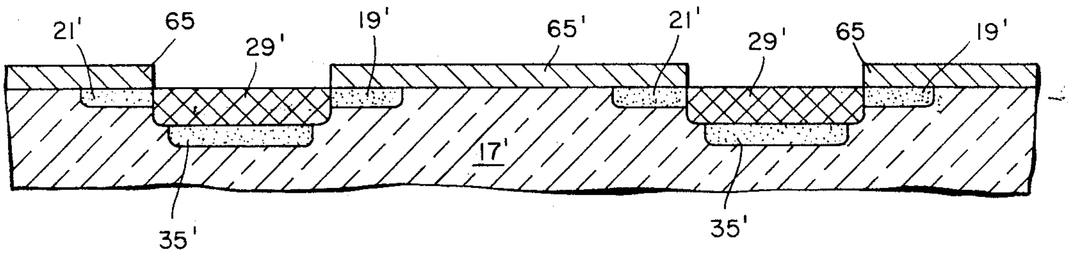
Figure 4I:
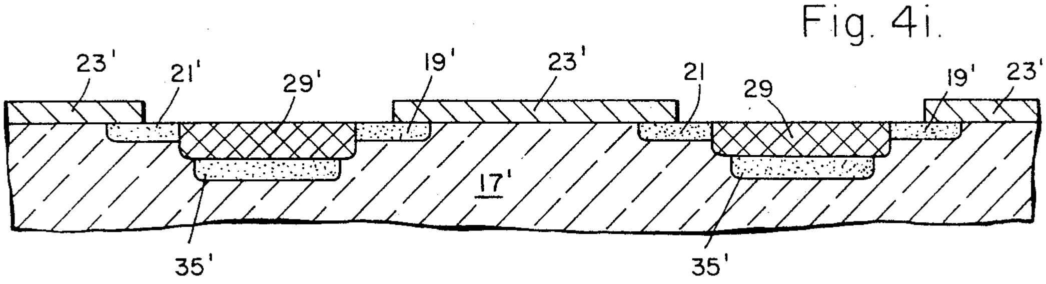
Figure 4J:
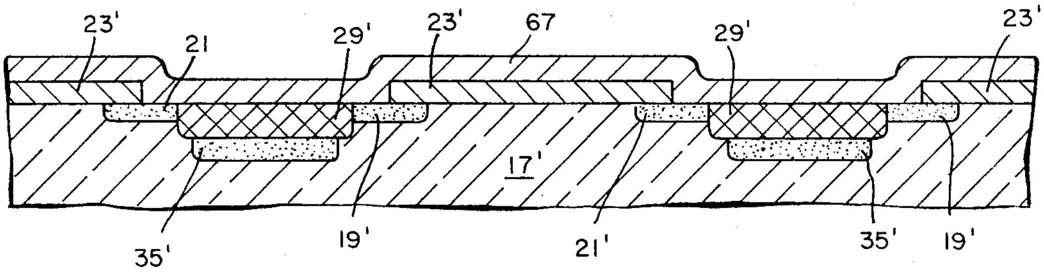
Figure 4K:
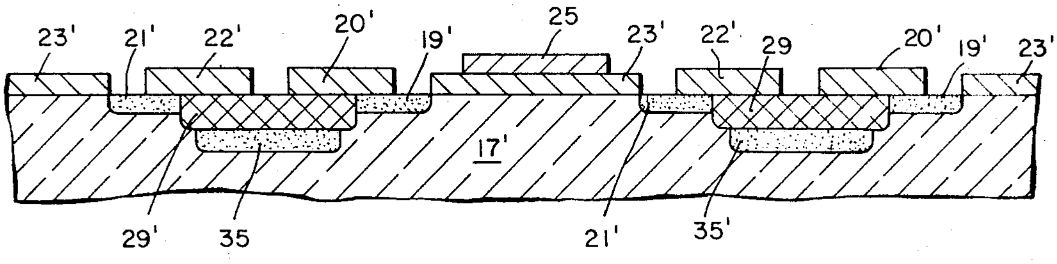

Having completed the conventional diffusion step whereby the source and drain regions 19' and 21' are formed, the silicon nitride mask 63 is removed (FIG. 4*g*) and is replaced by growing a layer of silicon dioxide 65 on the substrate surface (FIG. 4*h*). Portions of the silicon dioxide layer 65 are then removed by standard lithographic techniques so as to expose the source and drain regions 19' and 21' (FIG. 4*i*), the remaining portions of the layer 65 serving as the gate oxides 23'. A layer of aluminum 67 is then deposited, preferably by evaporation (FIG. 4*j*). Finally, the aluminum layer 67 is separated, as by etching, to form the individual source and drain contacts 20' and 22' as well as the gate electrode 25' on top of the gate oxides 23', thus producing the integrated circuit initially illustrated in FIGS. 2 and 3.

What is claimed is:

1. A method of doping the field region between adjacent MIS devices in a common semiconductor substrate doped to have a given conductivity type, comprising the steps of:

(a) excavating a depression in the exposed surface of said substrate;

(b) increasing the doping of the substrate at the bottom of said depression by ion implantation, said increased doping stopping short of the edge of said depression;

(c) filling said depression with an insulator; and (d) forming source-drain diffusions in said surface of said substrate for said adjacent MIS devices, including a pair of such diffusions on opposite sides of, and immediately adjacent to, the edges of said insulator.

2. A method of doping the field region between adjacent MIS devices in a common semiconductor substrate doped to have a given conductivity type, comprising the steps of:

(a) forming a mask on said substrate, said mask having a gap therein to expose a portion of a surface of said substrate;

(b) excavating a depression in the exposed surface of said substrate, the edges of said depression extending past said gap so as to undercut said mask;

(c) increasing the doping of the substrate at the bottom of said depression by ion implantation over an area corresponding to said gap;

(d) filling said depression with an insulator; and (e) forming source-drain diffusions in said surface of said substrate for said adjacent MIS devices, including a pair of such diffusions on opposite sides of, and immediately adjacent to, the edges of said insulator.

3. The method of claim 2 wherein the doping of said substrate is increased by implanting ions therein through said gap in order to limit the implanted area to the substrate portion lying under said gap.

4. The method of claim 2 wherein said depression is excavated by exposing it to an etchant.

5. The method of claim 2 wherein said depression is excavated by subjecting it to oxidation and then stripping the oxide so formed.

6. The method of claim 2 wherein the depth of said source-drain diffusions is less than that of said insulator in order to ensure separation between said diffusions and said more heavily doped region.

7. A method of doping the field region between adjacent MIS devices in a common silicon substrate of a given conductivity type comprising the steps of:

(a) forming a mask on said substrate, said mask having gaps corresponding to respective ones of said field regions;

(b) excavating depressions in the surface of said substrate through respective ones of said gaps, the edges of said depressions extending past said gaps so as to undercut said mask;

(c) implanting through said gaps into said substrate immediately underneath the bottoms of said depressions ions of the same conductivity type as said substrate to form ion implanted regions substantially coextensive with said gaps, with the undercutting edges of said depressions remaining unimplanted;

(d) thermally growing silicon dioxide in said depressions over said ion implanted regions until substantially level with the surface of said substrate;

(e) exposing portions of said silicon substrate on opposite sides of, and immediately adjacent to the edges of the thermally grown silicon dioxide in said depressions; and (f) forming source-drain diffusions in said substrate at said exposed portions to a depth less than that of said thermally grown silicon dioxide.

8. A method of forming in a semiconductive substrate a pair of closely spaced doped regions separated by an insulator comprising the steps of:

(a) forming a mask on said substrate, said mask having a gap to expose a portion of the surface of said substrate;

(b) excavating a depression in the exposed surface of said substrate, an edge of said depression extending past said gap so as to undercut said mask;

(c) implanting through said gap into said substrate conductivity-determining ions to form an ion implanted region substantially coextensive with said gap, with the edge of said depression which lies under said mask remaining unimplanted;

(d) substantially filling said excavation with an insulating material; and (e) forming a pair of doped regions in said substrate immediately adjacent said depression and on opposite sides thereof to a depth less than that of said insulating material, whereby said pair of regions are laterally spaced by the insulating material under the undercut portion of said mask.

9. In a method of forming a plurality of semiconducting devices in a common semiconductor substrate doped to have a given conductivity type, the steps of:

(a) forming spaced apart mask portions on a surface of said semiconductor substrate, leaving unmasked areas exposed under the gaps between said mask portions;

(b) excavating said exposed areas, slightly undercutting said mask portions so as to create mesas slightly smaller than said mask portions;

(c) at the bottom of said excavated areas increasing the doping of said semiconductor substrate by ion implantation over an area corresponding to said gaps between said mask portions;

(d) rebuilding said excavated areas with an insulating material; and (e) forming a pair of spaced apart source and drain regions in the surface of each of said mesas.

10. The method of claim 9 characterized further in that said source and drain regions are formed by:

(a) forming masks on said mesas which expose the ledges of said mesas abutting said excavated areas; and (b) exposing said substrate to the vapor of an impurity of the opposite conductivity type from that of said substrate so as to form said source and drain regions in the ledges of said mesas.

References Cited

UNITED STATES PATENTS

| | | | |
|---|---|---|---|
| 3,448,344 | 6/1969 | Schuster et al. | 317—235 E X |
| 3,500,140 | 3/1970 | Makimoto et al. | 317—235 F |
| 3,534,234 | 10/1970 | Clevenger | 317—235 R |
| 3,648,125 | 3/1972 | Pelzer | 317—235 R |
| 3,655,457 | 4/1972 | Duffy et al. | 148—1.5 |

L. DEWAYNE RUTLEDGE, Primary Examiner

J. M. DAVIS, Assistant Examiner

U.S. Cl. X.R.

148—187; 317—235